United States Patent [19]

Ottenberg

[11] Patent Number: 4,560,559

[45] Date of Patent: * Dec. 24, 1985

[54] YEAST-RAISABLE WHEAT-BASED FOOD PRODUCTS THAT EXHIBIT REDUCED DETERIORATION IN PALATABILITY UPON EXPOSURE TO MICROWAVE ENERGY

[75] Inventor: Ray Ottenberg, Washington, D.C.

[73] Assignee: Lee Ottenberg, Bethesda, Md. ; a part interest

[ * ] Notice: The portion of the term of this patent subsequent to Jul. 31, 2001 has been disclaimed.

[21] Appl. No.: 500,829

[22] Filed: Jun. 3, 1983

Related U.S. Application Data

[63] Continuation-in-part of Ser. No. 407,621, Aug. 12, 1982, Pat. No. 4,463,020.

[51] Int. Cl.[4] .......................... A21D 8/00; A21D 13/00
[52] U.S. Cl. .......................................... 426/19; 426/27; 426/62; 426/243; 426/391; 426/549
[58] Field of Search .................. 426/18, 19, 20, 21, 426/27, 62, 241, 243, 391, 446, 496, 497, 549, 622

[56] References Cited

U.S. PATENT DOCUMENTS

| | | |
|---|---|---|
| 1,234,858 | 7/1917 | Blacklock . |
| 1,263,609 | 4/1918 | Schuyler . |
| 2,041,129 | 5/1936 | Hoffman .................................. 99/33 |
| 3,076,710 | 2/1963 | Koolhaas ................................. 99/90 |
| 3,630,755 | 12/1971 | Schiffmann et al. .............. 219/10.55 |
| 3,752,675 | 8/1973 | Tsen et al. .............................. 426/21 |
| 4,157,403 | 6/1979 | Schiffmann et al. ................. 426/234 |
| 4,318,931 | 3/1982 | Schiffmann et al. ................. 426/243 |
| 4,404,227 | 9/1983 | Pomper et al. ................... 426/551 |
| 4,463,020 | 7/1984 | Ottenberg ............................. 426/19 |

OTHER PUBLICATIONS

"Reformulating for Microwaves", Food Tech., vol. 25, 921, Sep. 1971.

"Frozen Breads Could Be (Micro)Wave of the Future", Bakers Digest, Oct., 1980, pp. 7–9, Patel, K. M.; Hallerback, C. M.; and Bergan, J. G.

"Preparation and Heating Techniques for Vended Food Items", from Microwave Food Vending Manual of Litton Microwave Cooking Products, Minneapolis, Minn., pp. 5–6.

Primary Examiner—Robert Yoncoskie
Assistant Examiner—Marianne M. Cintins
Attorney, Agent, or Firm—Finnegan, Henderson, Farabow, Garrett & Dunner

[57] ABSTRACT

Yeast-raised wheat-based food products having improved resistance to deterioration caused by microwave heating are prepared from formulations comprising wheat flour, yeast and an effective amount of at least one starch, such as a rice starch, corn starch or wheat starch, of average crystal size less than about 20 microns and sufficiently small to reduce deterioration in the palatability of the food product caused by microwave energy. The food products are made by mixing such a formulation into a dough and baking the dough formulation for a time and at a temperature sufficient to form a yeast-raised wheat-based food product.

38 Claims, No Drawings

4,560,559

YEAST-RAISABLE WHEAT-BASED FOOD PRODUCTS THAT EXHIBIT REDUCED DETERIORATION IN PALATABILITY UPON EXPOSURE TO MICROWAVE ENERGY

This application is a continuation-in-part of the application of the inventor herein entitled "Yeast-Raisable Wheat-Based Food Products That Exhibit Reduced Deterioration In Palatability Upon Exposure To Microwave Energy," Ser. No. 407,621, filed on Aug. 12, 1982, now U.S. Pat. No. 4,463,020. The disclosure of said application Ser. No. 407,621 is hereby expressly incorporated by reference, in its entirety, herein.

FIELD OF THE INVENTION

This invention relates to new yeast-raised wheat-based food products, compositions, and their preparation and use. More particularly, this invention relates to yeast-raised wheat-based food products which exhibit resistance to deterioration in palatability caused by exposure to microwave energy and the formulation for and method of preparation of such food products.

BACKGROUND OF THE INVENTION

The use of microwave energy for heating food products has become widespread. Heating by microwave energy of yeast-raised wheat-based food products such as bread and roll products has likewise become widespread. Applications of microwave energy for heating machine vendable sandwiches and breakfast type rolls are visible examples of this current use.

Problems have arisen with the use of microwave energy for heating traditional yeast-raised wheat-based food products such as bread and roll products. Traditional bread and roll products become impalatable after short exposures to microwave energy. The term palatable or palatability refers to the eating quality of food products. Palatable food products are agreeable to the taste and possess an appetizing appearance and texture.

Upon exposure to microwave energy, the crust of traditional bread and roll products becomes extremely tough. The crust of such microwave exposed products may become so tough that it is difficult to tear such products. The bread product itself may become soggy or develop hard lumpy portions. The crumb of the products becomes rubbery and gummy and is difficult to chew. Consequently, traditional bread and roll products, upon exposure to microwave energy, are not palatable.

An article entitled "Reformulating for Microwave," 25 Food Technology 921 (September 1971), describes the effect of microwaving on bread and suggests a reformulation for breads that are intended to be exposed to microwave energy. The article explains that the rate at which food products absorb microwave energy depends to a great measure on their moisture content. Products with high moisture contents, such as normally commercially baked sandwich rolls, heat very rapidly in a microwave oven. When filled sandwiches made with normal sandwich rolls are heated in a microwave oven, the rolls tend to overheat before the filling reaches serving temperature, substantially reducing the palatability of the overheated rolls.

Attempts have been made to deal with the problems associated with exposure of bread and roll products to microwave radiation, but have met with limited success. Methods for making bread and roll products for microwave applications have been tried using "rich" formulations. These "rich" formulations are low in water and high in sugar, shortening and egg. As suggested and described in the above-mentioned "Food Technology" article, buns prepared according to the "rich" formulation absorb microwave energy more slowly than do the traditional baked products, such as normal sandwich rolls, because of the lower moisture content of the "rich" products.

Pre-toasting of the bread and roll products has also been used to further reduce the water content in an attempt to alleviate the problems caused by exposure of the products to microwave energy. Use of day-old bread has also been suggested for improving a bread's ability to absorb microwave energy since day-old bread loses some of its natural moisture as it grows stale.

While minimal improvements in palatability have been obtained with the above-described reduced-moisture products, these improvements are in no way satisfactory because the reduced moisture products continue to evidence substantial reduction in palatability upon warming by exposure to microwave energy. The methods described above have additional drawbacks. Utilization of a relatively expensive "rich" formula adds cost to production. Pre-toasting adds an additional step to bread preparation, increasing production cost and handling time. Use of day-old bread disadvantageously requires storage of bread for at least a day until it becomes sufficiently "stale".

As described in application Ser. No. 407,621 filed on Aug. 12, 1982, it has been found that yeast-raisable wheat-based food products having improved resistance to deterioration in palatability upon exposure to microwave energy can be produced by use of yeast-raisable wheat-based formulations that include rice flour. It has now been found that the key to the effectiveness of rice flour is the rice starch of which it is composed and that certain other starches can be added to yeast-raisable wheat-based formulations to improve resistance to deterioration in palatability upon exposure of yeast-raised wheat-based food products to microwave energy.

SUMMARY OF THE INVENTION

It is therefore an object of the present invention to provide a yeast-raisable wheat-based food product with improved resistance to deterioration in palatability due to exposure to microwave energy.

It is a further object of the invention to provide a formulation for and a method for making a yeast-raisable wheat-based food product which has improved resistance to deterioration in palatability upon exposure to microwave energy.

To achieve the objects in accordance with the purpose of the invention, as embodied and broadly described herein, the invention comprises a yeast-raised wheat-based food product comprising wheat flour, yeast and at least one starch having a sufficiently small crystal size and in an effective amount to reduce deterioration in the palatability of the food product upon exposure to microwave energy. It is believed that a starch having an average crystal size of less than about 20 microns will improve the resistance of a yeast-raised wheat-based food product to deterioration from exposure to microwave energy. Preferably, the starch has an average crystal size as close as possible to that of rice starch. It is preferred that the starch be selected from the group consisting of rice starch, wheat starch and corn starch, each such starch having an average crystal size of less than about 20 microns, preferably less than about 15 microns, and more preferably less than about 10 microns. The most preferred starch is rice starch and is preferably used in the form of long-grain rice flour. The long-grain rice flour or other starch material preferably comprises from about 5 to about 60 percent by weight of the weight of the wheat flour in the product, and more preferably from about 10 to about 20 percent by weight of the weight of the wheat flour in the product.

Preferred embodiments of the baked product of the invention further comprise vital wheat gluten and/or shortening. In a more preferred embodiment of the invention, the yeast-raised wheat-based food product comprises wheat flour, yeast, vital wheat gluten, water, shortening, salt and an amount of rice or other starch of relatively small average crystal size effective to reduce deterioration in the palatability of the food product caused by microwave energy. In the most preferred embodiment, the yeast-raised wheat-based food product further comprises egg, salt, mineral yeast food, malt, and syrup.

In preferred embodiments, the yeast-raised wheat-based food product is a white or dark bread product, such as but not limited to, white bread, rye bread, whole wheat bread, pumpernickel bread, raisin bread, pita bread, italian bread, or french bread. In further preferred embodiments the yeast-raised wheat-based food product is a pizza crust. In further preferred embodiments the yeast-raised wheat-based food product is a roll, such as a sandwich, hamburger, hot dog, submarine or Kaiser roll.

As embodied and broadly described herein, the invention also comprises a method of making a yeast-raised wheat-based food product of the invention comprising the steps of preparing a formulation comprising wheat flour, yeast, and an amount of starch as described above effective to reduce deterioration in the palatability of the bread product caused by microwave energy; mixing the formulation into dough; and baking the dough formulation for a time and at a temperature sufficient to form a yeast-raised wheat-based food product. Preferably, the formulation further comprises vital wheat gluten and shortening, and more preferably the formulation further includes water, syrup, salt, egg, malt, and mineral yeast food.

In a preferred method according to the invention, the starch as described above is added to the formulation in an amount in a range from about 5 to 60, more preferably from about 10 to 20, percent of the weight of the wheat flour in the baking formulation. In preferred embodiments according to the invention, the formulation is mixed for 4 to 30, more preferably for 8 to 16, minutes into a dough.

As embodied and broadly described herein, the invention also relates to a formulation for a yeast-raised wheat-based food product composition comprising a mixture of wheat flour, yeast and an amount of a starch as described above effective to reduce deterioration in the palatability of the bread product made from the formulation, the deterioration being caused by exposure to microwave energy. In preferred formulations, the amount of such starch in the composition is in the range of from about 5 to 60, more preferably from about 10 to 20, percent of the weight of the wheat flour in the formulation. In further preferred embodiments of the invention, the mixture further comprises vital wheat gluten, shortening, and salt.

As embodied and broadly described herein, the invention further comprises a formulation for a yeast-raisable wheat-based dough composition and a mixture of ingredients usable for making the dough composition comprising a mixture of wheat flour, yeast and an amount of a starch as described above effective to reduce deterioration of a bread product made from the formulation upon exposure to microwave energy.

It is to be understood that both the foregoing general and the following detailed description are exemplary and explanatory only and are not intended to be restrictive of the invention as claimed.

DETAILED DESCRIPTION OF THE PREFERRED EMBODIMENTS

Reference will now be made in detail to the present preferred embodiments of the invention. An example of a preferred embodiment is included at the end of this description.

In accordance with the invention the yeast-raised wheat-based food product comprises wheat flour, yeast, and a starch which is effective to reduce deterioration in the palatability of the food product upon exposure to microwave energy. As explained in Pyler, "Baking & Science Technology," volume 1, pages 18–23 (Siebel Publishing Company, Chicago, Ill. 1973), the size of starch granules, measured by microscopic examination as the length of the longest axis, can vary from about 2 microns to 150 microns. Rice starch is reported to have an average crystal size in the range of 3 to 6 microns and to be the smallest and most uniform of the common starches. Rice starch has been found to be the most consistently effective starch in improving the resistance of yeast-raised wheat-based food products to microwave deterioration and is the presently preferred starch for use in the practice of the invention.

Corn starch is reported to vary in average crystal size from 10 to 25 microns. Certain commercially available corn starch has been found to work well in improving the resistance of a yeast-raised wheat-based food product to microwave deterioration. However, some commercially available corn starch did not produce an improvement in microwavability. It is believed that the smaller the average crystal size, the more effective the corn starch.

Similarly, certain commercially available wheat starch has been found to improve resistance to deterioration from microwave heating. Wheat starch is reported to fall into two distinct size ranges, small granules of 2 to 8 microns crystal size and large granules of 25 to 35 microns crystal size. Some wheat starch works well in the practice of the invention while other wheat starch does not. In accordance with the invention, it is believed that the difference in performance is attributable to the different crystal sizes of wheat starches, with wheat starch of relatively small crystal size being effective in improving the resistance of yeast-raised wheat-based food products to deterioration caused by microwave energy.

In contrast, potato starch is reported to vary widely in average crystal size from 15 to 100 microns. Potato starches tested have been found not to improve the microwavability of yeast-raised wheat-based food products. Similarly, tapioca starch is reported to have an average crystal size of about 20 microns, and tapioca starch tested was not found to improve the resistance to deterioration due to microwave heating.

Accordingly, the starch desirably has an average crystal size sufficiently small to produce an improvement in resistance to deterioration of the yeast-raised wheat-based food product when used in an effective amount. Starches of less than about 20 microns in average crystal size have been found to be useful in the practice of the invention. Rice, corn and wheat starches of sufficiently small average crystal size are examples of suitable starches. Mixtures of effective starches as well as mixtures of effective starches with other additives, including less effective or ineffective starches, are also contemplated for use in the practice of the invention.

Preferably, the starch comprises from about 5 to about 60 percent by weight of the weight of the wheat flour. More preferably, the starch is present in a range of from about 10 to about 20 percent by weight of the weight of the wheat flour in the food product. The low range of the starch component is limited by the amount of starch that apparently needs to be present in order to provide significant resistance to the deterioration in palatability upon exposure of the food product to microwave energy. The upper range is limited by the amount of starch that the food product can contain and still remain yeast-raisable and have a wheat-based product flavor and texture.

It is the addition of the starch component which enables the wheat-based food product of the invention to resist deterioration in palatability upon exposure to microwave energy. Rice starch in the form of rice flour is the preferred starch. "Long-grain" rice flour is most preferred for use in the products of the invention; however, there does not appear to be any particular reason why short-grain or a mixture of long-grain and short-grain rice flour could not be advantageously used according to the invention.

Preferred yeast-raised wheat-based food products additionally comprise vital wheat gluten. Vital wheat gluten is highly concentrated gluten protein that is used as an additive to supplement and boost the amount of gluten present in a baked product. The vital wheat gluten is added so that the yeast-raised wheat-based food product will maintain its shape during yeast-raising without collapse. The vital wheat gluten also maintains the balance of the wheat-based formulation. Addition of an effective amount of vital wheat gluten compensates for the presence of non-gluten containing ingredients, such as rice flour.

Preferred embodiments of the invention also contain shortening. Shortening or lubricating substitutes such as oils add lubrication to food products so they may be easily sliced, chewed, and swallowed. Shortening or oil also provides lubrication for the mixing of flour and water into the dough, helping the dough retain natural gases that are utilized in the baking process. Overall, adding an effective amount of shortening or oil adds good taste and texture appeal to the wheat-based food products.

Preferred embodiments of the invention contain salt. Salt helps control fermentation of the yeast and provides flavor to the yeast-raised wheat-based food product.

Several other ingredients may be used to produce preferred embodiments of the invention. Sugar or syrup may be added to the food product to provide fermentable material to nourish the yeast and keep it active prior to and during the baking process. Eggs are added to the composition to provide improved taste to the wheat-based product. Specifically, eggs have been found to impart a bread-type flavor to the product of the invention. Malt is optionally added for coloring. Commercial sour, which is a cultivated bacteria culture, is optionally added for flavor.

Mineral yeast food is added to control fermentation and provide consistency to the finished products. Mineral yeast food finds most suitable application in commercial baking settings where less supervision of the yeast activity and uniform results are preferred. As is well known in the art, water is a necessary ingredient for the preparation of wheat based food products, and the amount of water added is chosen to achieve the moisture content desired for the particular food product intended.

The yeast-raised wheat-based food product according to the invention may be a roll-type product such as a Kaiser roll, breakfast roll, club roll, sandwich roll, etc. The yeast-raised wheat-based food product may also be a bread product, including for example, white or dark bread, such as rye bread, whole wheat bread, pumpernickel bread, raisin bread, pita bread, Italian bread, French bread, etc. The yeast-raised wheat-based food product according to the invention may also be a pizza crust.

In accordance with the invention, the yeast-raised wheat-based food product, described above, is made by preparing a formulation comprising wheat flour, yeast and the starch. The preferred formulation comprises a mixture of all the other ingredients described above. The correct amounts, not specifically indicated above, of ingredients to be used to produce balanced baked products, are within the ordinary skill of one skilled in the baking art.

In accordance with the invention, the starch is present in an amount effective to reduce deterioration in the palatability of the bread product upon exposure to microwave energy. The preferred amounts of starch are described above.

In accordance with the invention, the formulation is mixed into a dough by any conventional mixing means. Preferably, the formulation is mixed by conventional mixing means for 4 to 30 minutes, more preferably for 8 to 16 minutes, into a dough.

Preferably, there is no substantial "floor time" between mixing and baking the formulation. "Floor time" for the purposes of the present invention means the idle time that the mixed dough product is required to wait before being shaped and proofed prior to being placed in an oven environment for baking. "Proofing" is a step for allowing shaped dough to rest, free from drafts, by covering, placing in a "proof box," etc., so the yeast can act to allow the dough to rise to a desired volume. While proofing time will vary to suit individual needs of the yeast-raised baked product desired, the proofing period will generally be in the range of 20 to 30 minutes.

In accordance with the invention, the dough formulation is baked for a time and at a temperature sufficient to form a yeast-raised wheat-based food product. Baking times, the type of oven used and temperature of the oven will vary according to the product desired and the personal baking preferences of the baker. Generally, the wheat-based food product is baked until golden brown is achieved and a crust is developed. The yeast-raised wheat-based food product is then handled in any conventional manner to cool, pack and ship the final product.

The final food products produced according to the invention show resistance to deterioration in palatability upon exposure to microwave energy. Food products produced according to the present invention should maintain their good qualities of palatability upon exposure to microwave energy emitted by standard microwave ovens set at recommneded heating settings for warming breads, rolls, pizza, and sandwiches.

EXAMPLE

The invention will now be illustrated by example. The example is not intended to be limiting of the scope of the present invention. In conjunction with the general and detailed descriptions above, the example provides further understanding of the present invention.

The following example illustrates the making of a yeast-raised wheat-based food product according to the invention using long-grain rice flour as the source of rice starch added to the formulation to improve resistance to deterioration caused by microwave heating. The food product according to the following example is an "Improved Kaiser Roll". The improved kaiser roll is prepared by first mixing into a dough ingredients contained in the formula noted below. The formula is based on weight percents of the wheat flour used in the formulation. The wheat flour will be listed as 100 percent and each of the other ingredients will be listed as a weight percent in comparison to the weight of the wheat flour. The relative amount of ingredients used may also be viewed as pounds of ingredients per 100 pounds of wheat flour used.

| IMPROVED KAISER ROLL FORMULA | |
|---|---|
| INGREDIENTS | PERCENT OF INGREDIENTS PER 100% OF WHEAT FLOUR |
| Wheat flour (patent flour) | 100.00 |
| Long-grain rice flour | 15.00 |
| Water | 56.00 |
| Syrup | 8.00 |
| Shortening | 11.00 |
| Salt | 1.80 |
| Egg | 4.00 |
| Yeast | 4.00 |
| Malt | 1.00 |
| Vital wheat gluten | 1.00 |
| Mineral yeast food | .50 |
| Commercial sour | .50 |

The ingredients are mixed for approximately 12 minutes by any conventional mixing means suited to the volume of the ingredients used. The ingredients are mixed into a dough at a temperature of 78° F.

After the dough is mixed, the dough is then shaped to form the Improved Kaiser Rolls. There is no floor time necessary between mixing the dough, shaping the dough into rolls, and baking the dough into the improved kaiser rolls. The shaped or made up dough rolls are allowed to proof for about one hour prior to baking. The dough is baked in an oven at 450° F. for approximately 20 minutes or until the crust is sufficiently formed and golden brown in color. The rolls may then be cooled by any suitable means and packaged as desired.

COMPARISON

The effect of microwave exposure upon the food products of the invention versus conventional food products is shown by way of comparison of the "Improved Kaiser Roll" product, prepared according to the invention, to a "Traditional Kaiser Roll" product. The Traditional Kaiser rolls were prepared from the following formulation:

| TRADITIONAL KAISER ROLL FORMULA | |
|---|---|
| INGREDIENTS | PERCENT OF INGREDIENTS PER 100% OF WHEAT FLOUR |
| Wheat flour (patent flour) | 100.00 |
| Water | 52.00 |
| Yeast | 1.00 |
| Sugar | 2.00 |
| Shortening | 1.00 |
| Mineral Yeast Food | .50 |
| Salt | .50 |

The formulation was mixed into a dough at a temperature of 80° F. for approximately 12 minutes. The floor time betwen mixing and baking was 12 minutes. The dough was shaped into rolls and allowed to proof for about one hour before baking. The rolls were baked in an oven at 450° F. for approximately 20 minutes.

The following procedures for comparative testing were followed. Both the improved kaiser rolls of the invention and the traditional kaiser rolls were placed in a cooler and removed for heating with the temperature of the rolls being approximately 42° F. The rolls were placed in a standard 1000 watt microwave oven on a paper napkin to absorb excess moisture and left uncovered. The rolls were to be served at approximately 130° to 138° F. The microwave exposure of the 1000 watt unit was time set according to the number of rolls placed in the unit. When two rolls were placed in a microwave oven the unit was set for 15 seconds and the rolls were heated to 134° F. When six rolls were placed in the oven, the unit was set for 45 seconds, and the rolls were heated to 130° F.

The rolls were comparatively sampled by a variety of people. The traditional kaiser roll, when warmed in the microwave oven, was unanimously found to be unpalatable by reason of its toughness of crust. Further, the crumb of the traditional kaiser rolls became rubbery and gummy and difficult to chew. In contrast, the improved kaiser roll, prepared according to the present invention, remained soft and dry and retained its palatable qualities.

In addition to rice flour, other exemplary starch materials found to give good results in effective amounts in my experiments were "Pre Gel 10," a wheat starch sold by Midwest Solvents Co., and amioca, an unmodified hybrid corn starch. P.F. Powdered, an unmodified corn starch sold by PFP Corn Starch Co. sometimes worked and sometimes did not work. Apparently, the divergent results are attributable to differences in crystal size.

The yeast-raised wheat-based food products of the present invention have many advantageous applications. These products may be used and eaten without being exposed to microwave heating energy. The true advantage, of course, lies in the consumption of these food products when they are heated in a microwave oven.

Food products that may advantageously be prepared according to the present invention are sandwich rolls that are to be heated in a microwave oven from either a refrigerated or room temperature state, pizza crust for the making of pizza that is to be heated in a microwave, breakfast rolls and any other yeast-raised wheat-based food products intended to be heated in a microwave oven. Frozen food products are generally not advantageously prepared by microwave cooking because the ice in the product resists microwave energy. Food products according to the invention that are frozen should, therefore, be defrosted or thawed before being heated in a microwave oven.

The scope of the present invention is not limited by the description, examples and suggested uses herein, and modifications can be made without departing from the spirit of the invention. For example, the yeast-raised wheat-based food products may be only partially baked for applications as "brown and serve" food products. These products may be browned by conventional oven methods and re-heated in a microwave oven. Thus, it is intended that the present invention cover the modifications and variations of this invention provided they come within the scope of the appended claims and their equivalents.

What is claimed is:

1. A yeast-raised wheat-based food product which will substantially retain its palatability upon heating by microwave energy comprising wheat flour, yeast, and an effective amount of at least one starch of average crystal size less than about 20 microns to reduce deterioration in the platability of the food product upon heating by microwave energy.

2. A yeast-raised wheat-based food product according to claim 1 wherein the starch is selected from the group consisting of rice starch, corn starch and wheat starch.

3. A yeast-raised wheat-based food product according to claim 1 wherein the starch is a corn starch.

4. A yeast-raised wheat-based food product according to claim 1 wherein the starch is a wheat starch.

5. A yeast-raised wheat-based food product according to claim 1 wherein the starch has an average crystal size of less than about 15 microns.

6. A yeast-raised wheat-based food product according to claim 1 wherein the starch has an average crystal size of less than about 10 microns.

7. A yeast-raised wheat-based baked product according to claim 1 further comprising vital wheat gluten.

8. A yeast-raised wheat-based baked product according to claim 1 further comprising shortening.

9. A yeast-raised wheat-based food product according to claim 1 wherein the product is a bread product selected from the group consisting of white or dark breads.

10. A yeast-raised wheat-based food product according to claim 1 wherein the product is a pizza crust.

11. A yeast-raised wheat-based food product according to claim 1 wherein the starch comprises from about 5 to about 60 percent by weight of the weight of the wheat flour.

12. A yeast-raised wheat-based food product according to claim 11 wherein the starch comprises from about 10 to about 20 percent by weight of the weight of the wheat flour.

13. A yeast-raised wheat-based food product according to claim 1 wherein in the product is a roll.

14. A yeast-raised wheat-based food product according to claim 13 wherein the product is a roll selected from the group consisting of sandwich, hamburger, hot dog, submarine or Kaiser rolls.

15. A yeast-raised wheat-based food product which will substantially retain its palatability upon heating by microwave energy comprising wheat flour, yeast, vital wheat gluten, water, shortening and an effective amount of rice starch, corn starch or wheat starch having an average crystal size of less than about 20 microns to reduce deterioration in the palatability of the food product upon heating by microwave energy.

16. A yeast-raised wheat-based food product according to claim 15 further comprising egg, salt, mineral yeast foods, malt, and syrup.

17. A method of making a yeast-raised wheat-based food product comprising the steps of:
preparing a formulation comprising wheat flour, yeast, and an effective amount of at least one starch of average cystal size less than about 20 microns to reduce deterioration in the platability of the food product upon heating by microwave energy;
mixing the formulation into a dough; and
baking the dough formulation for a time and at a temperature sufficient to form a yeast-raised wheat-based food product; and heating the food product by exposing it to microwave energy.

18. A method according to claim 17 wherein the starch is selected from the group consisting of rice starch, corn starch and wheat starch.

19. A method according to claim 17 wherein the starch is a corn starch.

20. A method according to claim 17 wherein the starch is a wheat starch.

21. A method according to claim 17 wherein the starch has an average crystal size of less than about 15 microns.

22. A method according to claim 17 wherein the starch has an average crystal size of less than about 10 microns.

23. A method according to claim 17, wherein the formulation further comprises vital wheat gluten and shortening.

24. A method according to claim 17 wherein the starch is present in an amount in the range of from about 5 to 60 percent of the weight of the wheat flour in the baking formulation.

25. A method according to claim 24 wherein the starch is added in an amount in the range of from about 10 to 20 percent of the weight of the wheat flour in the baking formulation.

26. A method of making a yeast-raised wheat-based food product which will retain its palatability upon exposure to warming by microwave energy, comprising the steps of:
preparing a formulation of wheat flour, an effective amount of a rice starch, corn starch or wheat starch having a crystal size less than about 20 microns to reduce deterioration in the palatability of the food product upon heating by microwave energy, water, syrup, shortening, salt, egg, yeast, malt, vital wheat gluten, mineral yeast food and commercial sour to produce a bread product formulation;
mixing the formulation into dough; and
baking the dough formulation for a time and at a temperature sufficient to form a yeast-raised wheat-based food product; and heating the food product by exposing it to microwave energy.

27. A method according to claim 17 or 26 wherein the formulation is mixed for 6 to 30 minutes into a dough.

28. A method according to claim 17 or 26 wherein the formulation is mixed for 8 to 16 minutes into a dough.

29. A formulation, for a yeast-raised wheat-based food product composition which will substantially retain its palatability upon heating by microwave energy, comprising a mixture of wheat flour, yeast, and an effective amount of at least one starch of crystal size less than about 20 microns to reduce deterioration in the palatability of a food product made from the formulation upon heating by microwave energy.

30. A formulation according to claim 29 wherein the starch is selected from the group consisting of rice starch, corn starch and wheat starch.

31. A formulation according to claim 29 wherein the starch is a corn starch.

32. A formulation according to claim 29 wherein the starch is a wheat starch.

33. A formulation according to claim 29 wherein the starch has an average crystal size of less than about 15 microns.

34. A formulation according to claim 29 wherein the starch has an average crystal size of less than about 10 microns.

35. A formulation according to claim 29 wherein the mixture further comprises vital wheat gluten, shortening and salt.

36. A formulation according to claim 29 wherein the amount of the starch in the formulation is in the range of from about 5 to 60 percent of the weight of the wheat flour.

37. A formulation according to claim 36 wherein the amount of the starch in the formulation is in the range of from about 10 to 20 percent of the weight of the wheat flour.

38. A formulation for a yeast-raisable wheat-based dough composition used to make a food product which will substantially retain its palatability upon heating by microwave energy comprising a mixture of wheat flour, yeast, and an effective amount of a rice starch, corn starch or wheat starch having a crystal size of less than about 20 microns to reduce deterioration in the palatability of the food product upon heating by microwave energy.

* * * * *